(12) United States Patent
Tong et al.

(10) Patent No.: US 8,600,369 B2
(45) Date of Patent: Dec. 3, 2013

(54) REMOTE RING TONE CONTROL USING USSD

(75) Inventors: Yonghui Tong, Alpharetta, GA (US); Max Glenn Faulkner, Roswell, GA (US); Jeffrey Mikan, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 817 days.

(21) Appl. No.: 12/340,016

(22) Filed: Dec. 19, 2008

(65) Prior Publication Data

US 2010/0159913 A1 Jun. 24, 2010

(51) Int. Cl.
*H04M 3/00* (2006.01)
*H04M 1/00* (2006.01)

(52) U.S. Cl.
USPC ............................ 455/420; 455/419; 455/567

(58) Field of Classification Search
USPC .................................. 455/418, 419, 420, 567
See application file for complete search history.

(56) References Cited

U.S. PATENT DOCUMENTS

| | | | |
|---|---|---|---|
| 2005/0107100 A1* | 5/2005 | Gustafsson et al. | 455/466 |
| 2005/0239514 A1* | 10/2005 | Chiu | 455/567 |
| 2006/0215827 A1* | 9/2006 | Pfleging et al. | 379/142.02 |
| 2007/0123311 A1* | 5/2007 | Kim et al. | 455/567 |
| 2008/0057902 A1* | 3/2008 | Sidon | 455/401 |
| 2009/0234912 A1* | 9/2009 | Perrine et al. | 709/203 |

* cited by examiner

*Primary Examiner* — Marisol Figueroa
(74) *Attorney, Agent, or Firm* — Hartman & Citrin LLC

(57) ABSTRACT

Devices, systems and methods are disclosed which relate to a USSD assisted remote ring tone control service allowing a first mobile device to remotely add a ring tone and activate the ring tone of a second mobile device. A first mobile device contains a remote ring-tone control logic. The remote ring-tone control logic interacts with a USSD gateway server to send a ring tone to a second mobile device and remotely activates the ring tone. This requires authorization by a policy server which is in communication with the USSD gateway server. Once authorized, the first mobile device can upload a ring tone to a ring tone cache or find a ring tone on a network. The first mobile device then sends a URL to the second mobile device pointing to the ring tone either in the ring tone cache or elsewhere on the network. The second mobile device then downloads the ring tone. Once the download is confirmed the second mobile device activates the ring tone. The next time the first communications device makes a call to the second mobile device, the ring tone sounds through the second mobile device.

16 Claims, 5 Drawing Sheets

REMOTE RING TONE CONTROL USING USSD

BACKGROUND OF THE INVENTION

1. Field of the Invention

The present invention relates to controlling the ring tone of a mobile device. More specifically, the present invention relates to remotely controlling the ring tone of a mobile device via a USSD gateway server.

2. Background of the Invention

Wireless communications devices, such as cellular telephones, have become tremendously popular. It is estimated that there were 3.3 billion cellular phone subscriptions at the end of 2007. Close to 80% of the world now enjoys cellular coverage, a figure only increasing as new networks appear. Along with the abundance of cellular telephones comes the demand for new and improved services. It is no longer enough to just place and receive calls, users want it all.

Since introduction of ring tone service to wireless users, wireless operators have seen a rapid increase in usage of this service. The volume of ring tone downloads has been rising at an incredible pace in recent years. Data service revenue generated from ring tone downloading contributes a big part of the average revenue per user (ARPU) with respect to data among all wireless operators who offer such a service. The ring tone has been seen as a great way for personalization and individual representation.

Nevertheless, current ring tone service is only offered as a "server to mobile" service. A user downloads the service on his/her device and uses it on his/her own device. In certain instances a ring tone can be shared with another user, such as by copying it to another mobile device, but there are few mobile devices that allow this in a user-friendly manner. Carriers hesitate to make this process user-friendly for fear of facilitating copyright infringement and other digital rights management issues.

At the same time, users are still using the same communication process they have been using since the invention of the telephone. A call is placed, the caller waits through rings for the callee to answer, then they can talk. Nowadays, if the callee does not answer, the caller has an opportunity to record a voice message. However, this seems like a rather long process for a device with so many technological advances.

There is a service that connects mobile devices through a wireless network for digital communication. It is a USSD gateway server. USSD stands for Unstructured Supplementary Service Data. USSD is a means of transmitting information or instructions over a GSM/UMTS network. USSD has some similarities with short message services (SMS) since both use the GSM/UMTS network's signaling path. Unlike SMS, USSD is not a store and forward service and is session-oriented. When a user accesses a USSD service, a session is established and the radio connection stays open until the user, application, or time-out releases it. This has more in common with Circuit Switched Data than SMS. USSD text messages can be up to 182 characters in length.

What is needed in the art is a way to give callers the ability to control the ring tone on the callee's mobile device. The system should make use of more recent technologies in order to make the process fast and simple. The system also needs to handle copyright infringement and other digital rights issues as well.

SUMMARY OF THE INVENTION

The present invention is a USSD assisted remote ring tone control service allowing a first mobile device to remotely add a ring tone and activate the ring tone of a second mobile device. A first mobile device contains a remote ring-tone control logic. The remote ring-tone control logic interacts with a USSD gateway server to send a ring tone to a second mobile device and remotely activates the ring tone. This requires authorization by a policy server which is in communication with the USSD gateway server. Once authorized, the first mobile device can upload a ring tone to a ring tone cache or find a ring tone on a network. The first mobile device then sends a URL to the second mobile device pointing to the ring tone either in the ring tone cache or elsewhere on the network. The second mobile device then downloads the ring tone. Once the download is confirmed the second mobile device activates the ring tone. The next time the first mobile device makes a call to the second mobile device, the ring tone sounds through the second mobile device.

Furthermore, the ring tone can be completely customizable. A ring tone can be recorded or otherwise generated just before uploading. The second mobile device can edit policy permissions by the user to avoid unwanted ring tone changes or unwanted ring tones. Once the ring tone has been used by the second mobile device for a call from the first mobile device, a user of the second mobile device is prompted to purchase the ring tone. If the user of the second mobile device accepts, then a user of the first mobile device is credited.

In one embodiment, the present invention is a system for remotely changing the ring tone of a mobile device. The system includes a first mobile device, a USSD gateway server in communication with the first mobile device, a policy control server in communication with the USSD gateway server, and a second mobile device in communication with the USSD gateway and the first mobile device. The first mobile device adds and activates a ring tone on the second mobile device over a wireless network.

In another embodiment, the present invention is a method of remotely changing the ring tone of a mobile device through a USSD gateway server. The method includes receiving a request to add a ring tone to a mobile device, verifying a permission to add the ring tone to the mobile device, and uploading the ring tone to the mobile device. The ring tone is activated and sounds to alert a user of an incoming call.

In yet another embodiment, the present invention is a method of remotely changing the ring tone of a mobile device through a USSD gateway server. The method includes requesting to add a ring tone to a mobile device, and receiving a confirmation that the ring tone has been uploaded to the mobile device. The USSD gateway server receives the request and directs the mobile device to download the ring tone, a policy control server verifies permissions, and the ring tone is activated on the mobile device.

DETAILED DESCRIPTION OF THE INVENTION

Figure 1A:
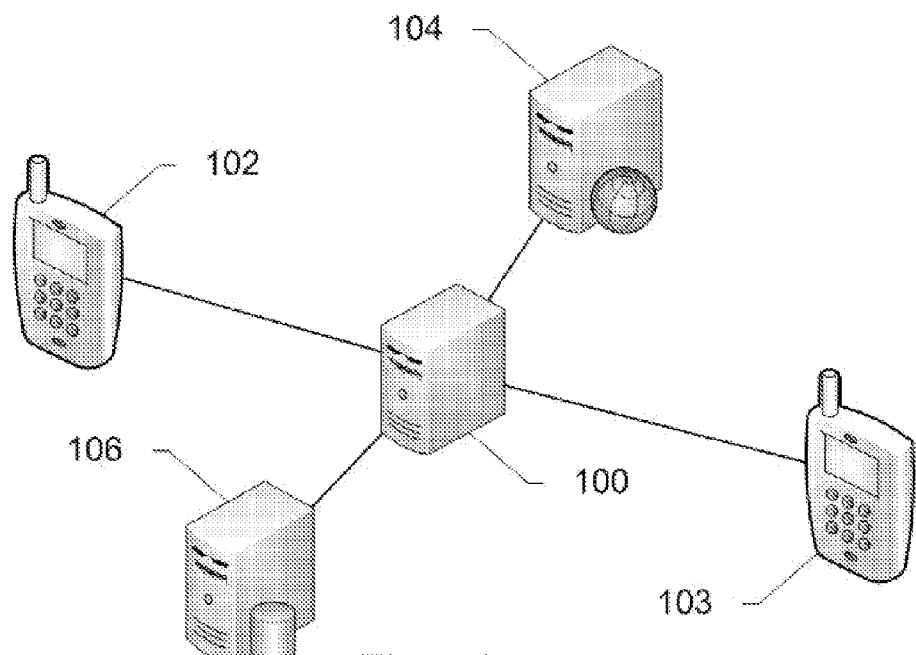
FIG. 1A shows a system for remote ring tones uploaded from a caller's mobile device, according to an exemplary embodiment of the present invention.

The present invention is a USSD assisted remote ring tone control service allowing a first mobile device to remotely add a ring tone and activate the ring tone of a second mobile device. A first mobile device contains a remote ring-tone control logic. The remote ring-tone control logic interacts with a USSD gateway server to send a ring tone to a second mobile device and remotely activates the ring tone. This requires authorization by a policy server which is in communication with the USSD gateway server. Once authorized, the first mobile device can upload a ring tone to a ring tone cache or find a ring tone on a network. The first mobile device then sends a URL to the second mobile device pointing to the ring tone either in the ring tone cache or elsewhere on the network. The second mobile device then downloads the ring tone. Once the download is confirmed the second mobile device activates the ring tone. The next time the first mobile device makes a call to the second mobile device, the ring tone sounds through the second mobile device.

Furthermore, the ring tone can be completely customizable. A ring tone can be recorded or otherwise generated just before uploading. The second mobile device can edit policy permissions by the user to avoid unwanted ring tone changes or unwanted ring tones. Once the ring tone has been used by the second mobile device for a call from the first communications device, a user of the second mobile device is prompted to purchase the ring tone. If the user of the second mobile device accepts, then a user of the first mobile device is credited.

"Mobile device," as used herein and throughout this disclosure, refers to a device capable of wireless communication with another such device. Examples of a mobile communications device include a cellular telephone, a personal digital assistant (PDA), a computer, etc. A mobile device is also referred to in this disclosure as a "user equipment" (UE).

"Caller," as used herein and throughout this disclosure, refers to one who places a call in pursuit of communication. A caller can place a call by dialing a telephone number, inputting an internet protocol (IP) address, etc.

"Callee," as used herein and throughout this disclosure, refers to one with whom communication is pursued through a call. A callee does not need to answer the call to be considered a callee.

"Ring tone", as used herein and throughout this disclosure, refers to any audio media that can be played by a mobile device. This includes any digital audio media with codecs supported by the mobile device. The actual sound emitted by the ring tone does not need to resemble a traditional "ring" in any way. Within this disclosure are examples of ring tones that are far from the traditional "ring."

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

Figure 1B:
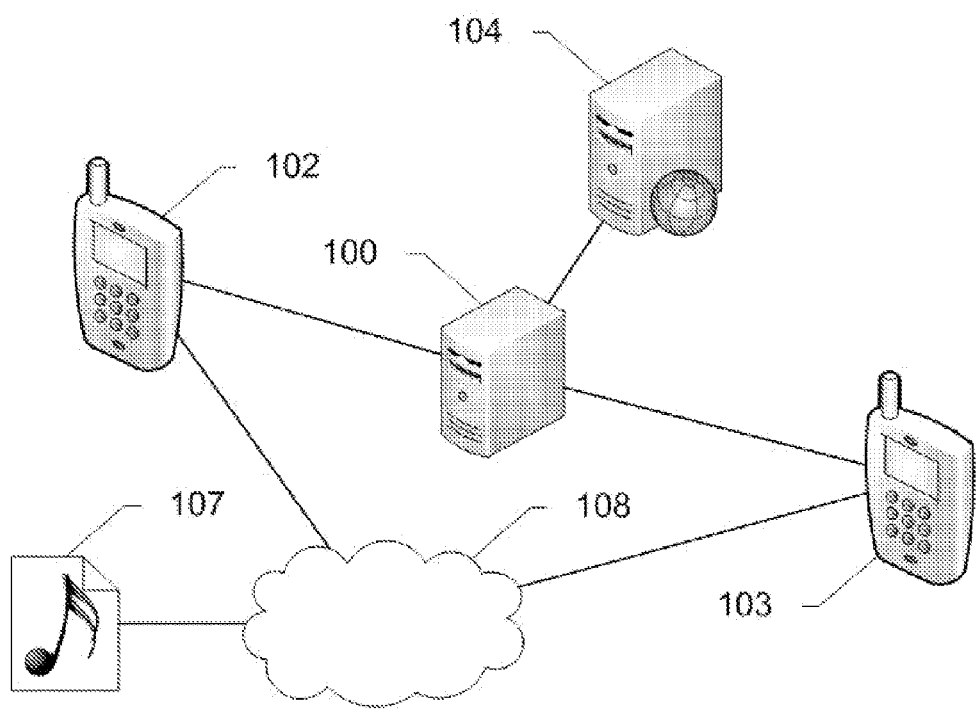
FIG. 1B shows a system for remote ring tones uploaded from a network, according to an exemplary embodiment of the present invention.

FIGS. 1A and 1B show exemplary embodiments of systems for remote ring tone control. These systems allow a caller to select a ring tone to be played on the callee's mobile device. With possible configurations, the caller may select a ring tone from the caller's mobile device, select a ring tone from an outside source, create a ring tone, etc.

FIG. 1A shows a system for remote ring tones uploaded from a caller's mobile device 102, according to an exemplary embodiment of the present invention. In this embodiment, the system includes caller's mobile device 102, a USSD gateway server 100, a policy control server 104, a cache server 106, and a callee's mobile device 103. Caller's mobile device 102 allows a caller to select a ring tone from the memory of caller's mobile device 102 or create a new ring tone, such as a voice recording. Caller's mobile device 102 uses these selections to make a request for a remote ring tone control. USSD gateway server 100 receives this request from caller's mobile device 102. USSD gateway server 100 is responsible for processing, routing and communicating with caller's mobile device 102 and callee's mobile device 103 through USSD signaling. In this embodiment, the request includes a file containing the ring tone to be used. USSD gateway server 100 sends the included ring tone file to ring tone cache server 106 where it is stored. Ring tone cache server 106 is responsible for temporarily storing any caller-generated or uploaded ring tone. USSD gateway server 100 communicates with policy control server 104 to determine whether or not callee has allowed remote ring tones from caller. Policy control server 104 is responsible for authorizing a remote ring tone control request based upon the callee's subscription. For example, a callee would not want everyone on her contact list to have right to remotely alter her ring tone. Therefore, the callee specifies which caller's have the right as well as the extent of their right. If the callee has given the caller permission to remotely alter the callee's ring tone, then USSD gateway server 100 uploads the included ring tone from cache server 106 to callee's mobile device 103. When caller's mobile device 102 places a call to callee's mobile device 103, the ring tone sounds.

FIG. 1B shows a system for remote ring tones uploaded from a network, according to an exemplary embodiment of the present invention. In this embodiment, the system includes a caller's mobile device 102, a USSD gateway server 100, a policy control server 104, a network 108, a ring tone 107 on network 108, and a callee's mobile device 103. Caller's mobile device 102 allows caller to select ring tone 107 from ring tones available on network 108. Caller's mobile device 102 uses this selection to make a request for a remote ring tone. USSD gateway server 100 receives this request from caller's mobile device 102. USSD gateway server 100 is responsible for processing, routing and communicating with caller's mobile device 102 and callee's mobile device 103 through USSD signaling. USSD gateway server 100 searches for and confirms the location of ring tone 107. USSD gateway server 100 communicates with policy control server 104 to determine whether or not callee has allowed remote ring tones from the caller. Policy control server 104 is responsible for authorizing a remote ring tone control request based upon the callee's subscription. If the callee has given the caller permission to remotely alter the callee's ring tone, USSD gateway server 100 uploads ring tone 107 from network 108 to callee's mobile device 103. When caller's mobile device 102 places a call to callee's mobile device 103, the ring tone sounds.

The USSD gateway server is also responsible for recording sales of ring tones driven by remote control ring tone service usage and crediting the initiating users. The ring tone is downloaded to a targeted mobile device though a WAP download.

Using these systems a caller can remotely control the ring tone of a callee's mobile device. The process behind the remote ring tone control involves permissions and confirmations in addition to the actual transfer of the ring tone to another mobile device.

Figure 2:
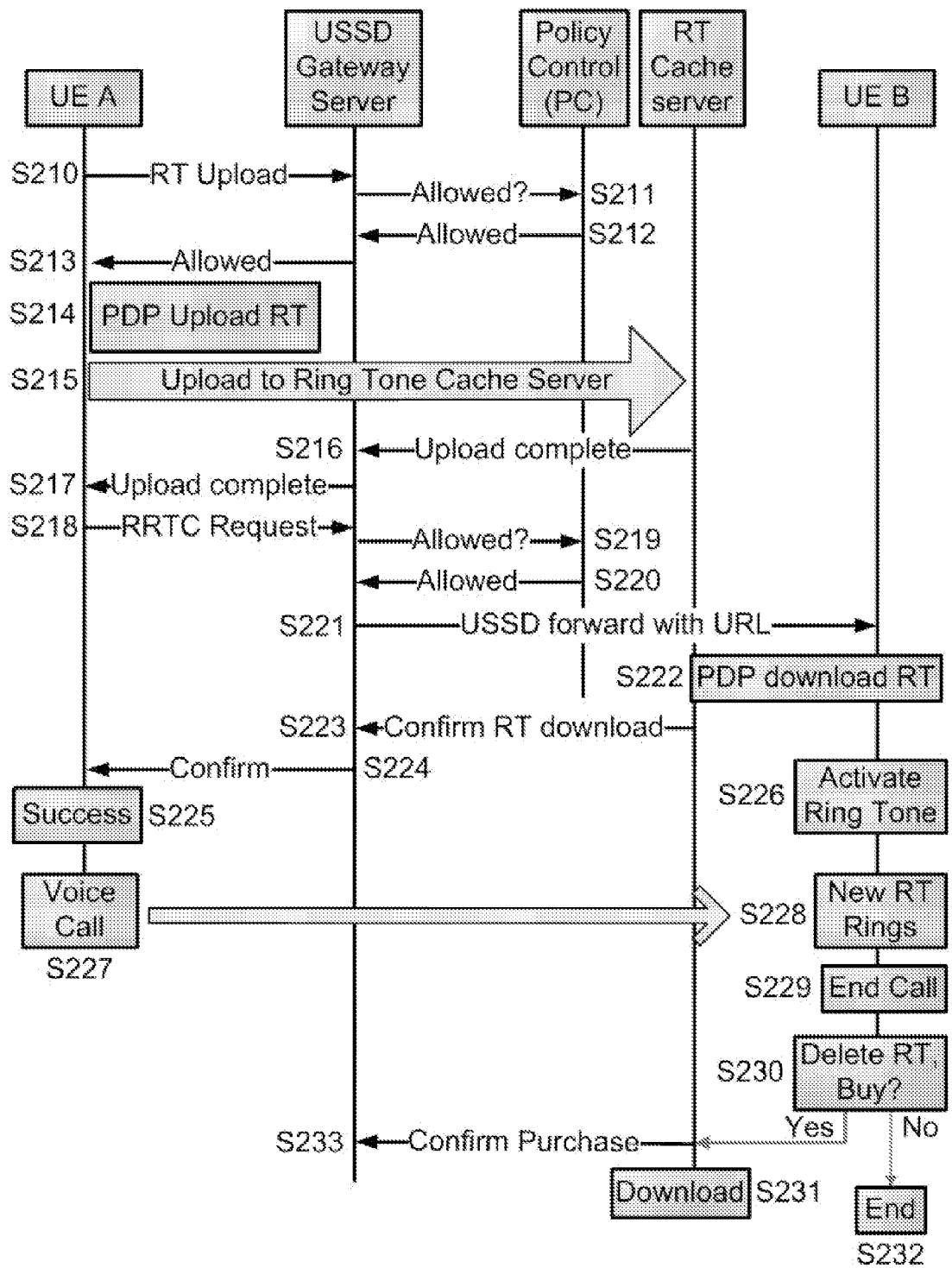
FIG. 2 shows a method of remotely sending a ring tone from one device to another device, according to an exemplary embodiment of the present invention.

FIG. 2 shows a method of remotely sending a ring tone from one device, UE A, to another device, UE B, according to an exemplary embodiment of the present invention. In this embodiment, UE A sends a USSD request to a USSD Gateway Server (UGS) with User A's telephone number (MSISDN). This request contains a special USSD code indicating a RRTC service is required. UE A also checks the digital rights signature of the ring tone User A selects. If the content is allowed to be uploaded, then the request is processed S210. Otherwise, UE A stops and alerts User A of unauthorized use. For instance, if the ring tone is user generated, as in the case of a voice recording, then UE A allows the USSD request to be sent out. If the ring tone is a downloaded content from the operator's network, such as if User A has purchased the ring tone, then the request is processed. Whether or not User A has a Remote Ring Tone Control service that allows content purchased from the same operator to be shared "temporarily" over Remote Ring Tone Control service is later verified.

The UGS processes the request received from UE A and inquires into the Policy Control (PC) server database to find out if User A has an RRTC service S211. The PC Server responds with an "allowed" message, acknowledging User A's subscription S212. The "allowed" response is sent to user A through USSD messages S213. UE A then initiates a Packet Switch (PS) data call to the network to upload the content (ring tone) to the RT Cache server S215. If UE A does not have an active PDP context yet, then this process involves a Packet Data Protocol (PDP) Context activation process S214. Once uploading to the RT Cache server is successful, the RT Cache server notifies the UGS of the newly uploaded ring tone from User A, including the URL for temporarily stored content S216. The UGS notifies UE A of the completion of the uploading, with the URL included S217. UE A then sends the USSD request to the UGS, including UE B's telephone number and the newly received URL of the uploaded ring tone S218. The UGS inquires into the PC server to validate that User B allows User A to control User B's ring tone S219. The PC server responds with "remote control allowed" S220. The UGS then forwards UE A's request with the embedded URL to UE B over a USSD message with special USSD code indicating the RRTC service is invoked S221.

Upon receiving the USSD message, UE B recognizes it as an RRTC service and thus extracts the embedded URL address and starts the PS data call process to download the content at the URL address on the network S222. A PDP Context activation is required for this process.

The RT Cache server notifies the UGS of the completion of the ring tone download by UE B S223. The UGS then forwards the download completion result to UE A, over a USSD message S224. UE A then displays the result to User A S225. At this point, User A can make a voice call to User B and make UE B ring with the newly activated and remotely transferred ring tone. At the same time, UE B processes the newly downloaded ring tone through the RRTC process, as a temporarily active ring tone S226. UE B uses this ring tone if a call is received from User A and from User A only. A voice call from any other caller does not invoke the usage of the newly downloaded ring tone.

After the ring tone has been downloaded to UE B, User A initiates a voice call to User B over a regular voice call switch network S227. UE B rings with the temporary ring tone previously sent by User A S228. After the voice call is complete, the call is ended S229.

UE B deletes the ring tone from the cache database in UE B and prompts User B with the option to purchase the ring tone if the ring tone is a downloadable content from the service provider's network S230. In the case of network downloadable content where User B chooses to download it, UE B initiates a regular PS data call to download the content S231. In the case of a network downloadable content where User B chooses not to download it, UE B discards the content S232.

Following a download by UE B, the RT Cache server notifies the UGS of the completion of the ring tone download by User B. Credit is posted to User A's account for the sale of the ring tone to User B S233. Such credit can be forwarded to a billing system for further use. The newly downloaded ring tone from User A is deleted from UE B if no voice call is received from User A for a configurable period of time. This period of time may be set by User B, User A, or the service provider as a default.

For a device with always-on PDP context, step S214 is skipped. If no further USSD request is received from User A after step S217 in a configurable period of time, for example thirty minutes, then the newly uploaded ring tone is deleted from the ring tone cache server. In this event, the UGS initiates such a deletion request to the ring tone cache server.

In some cases, a caller desires to play a ring tone on a callee's mobile device that is not currently on the caller's mobile device. The caller must find this ring tone elsewhere on the wireless network or on a network in communication with the wireless network. However, once found, the process may be simpler in that instead of taking the time to upload a ring tone, a URL of the ring tone is simply transferred to the callee's mobile device.

Figure 3:
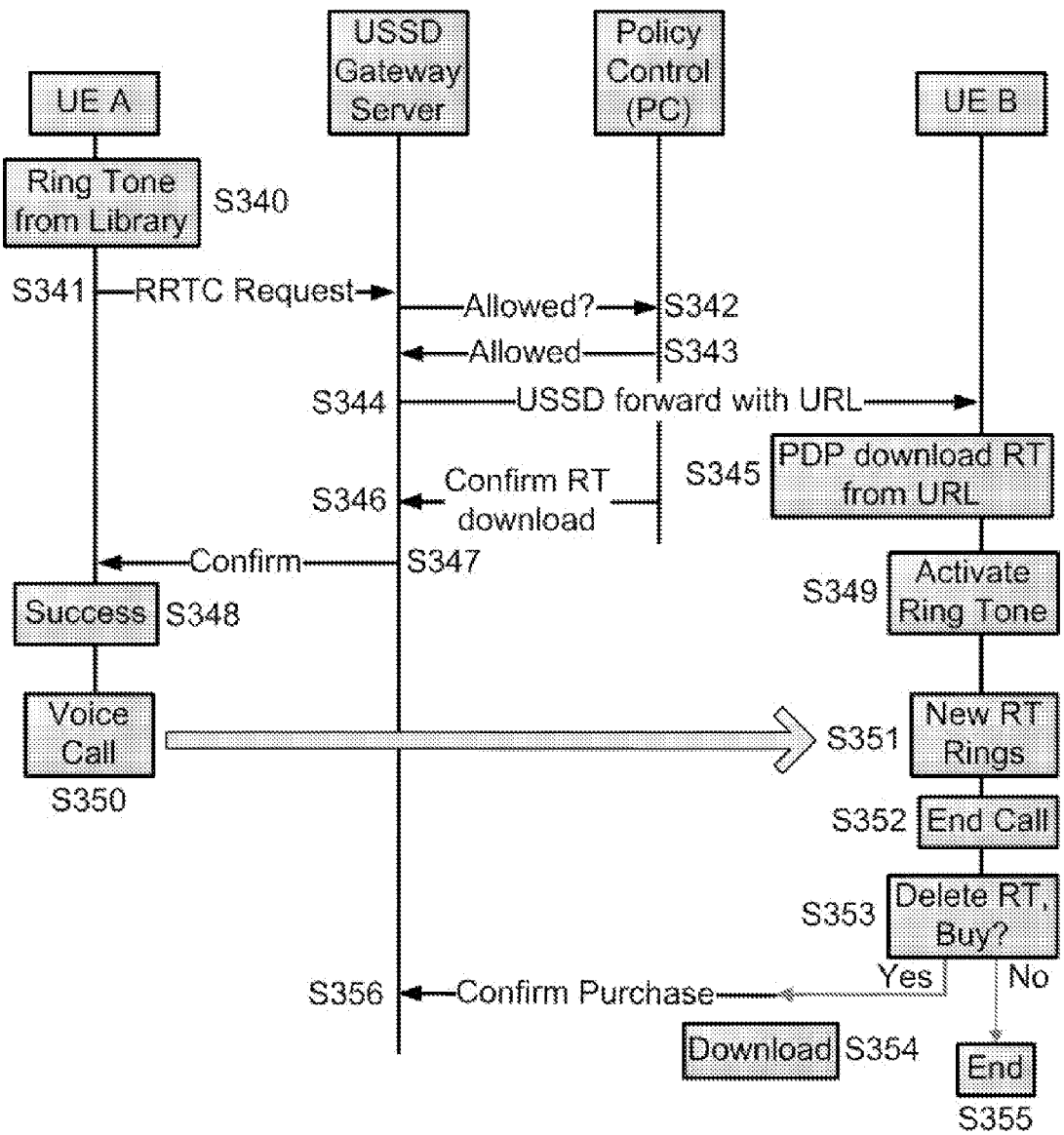
FIG. 3 shows a method of a device remotely sending a ring tone from a server to another mobile device, according to an exemplary embodiment of the present invention.

FIG. 3 shows a method of a device, UE A, remotely sending a ring tone from a server to another device, UE B, according to an exemplary embodiment of the present invention. User A initiates a Packet Switch (PS) data call to the network to locate a content, such as a ring tone, that User A wants to use S340. This process involves a PDP (Packet Data Protocol) Context activation. After locating the desired ring tone, User A sends USSD messages to the UGS requesting the selected ring tone to be used on UE B S341. The USSD request includes a telephone number of both User A and B, as well as a URL of the selected ring tone.

The UGS processes the request received from UE A and inquires into the Policy Control (PC) server database to find out if User A has an RRTC service. The PC Server responds with an "allowed" message, acknowledging User A's subscription S342. The UGS then forwards User A's request with the embedded URL to UE B over a USSD message with a special USSD code indicating the RRTC service is invoked S343.

Upon receiving the USSD message, UE B recognizes it as the RRTC service, extracts the embedded URL, and starts the PS data call process to download the ring tone at the URL on the network S344. This process involves PDP context activation S345.

The ring tone cache server notifies the UGS when the ring tone download by UE B is complete S346. The UGS then forwards the download completion result to UE A over a USSD message S347. UE A then displays the result to User A S348. At this point, User A can make a voice call to User B and make UE B ring with the newly activated and remotely transferred ring tone.

At the same time, UE B processes the newly downloaded ring tone through the RRTC process, as a temporary active ring tone S349. UE B uses the ring tone if a call is received from User A and from User A only. A voice call from any other callers does not invoke the usage of the newly downloaded ring tone from User A.

After the temporary ring tone has been downloaded to UE B, User A initiates a voice call to User B, over a regular voice call switch network S350. UE B rings with the temporary ring tone S351. When the call has finished, the call is ended S352. UE B deletes the ring tone from the cache database in UE B and prompts User B with the option to purchase the ring tone, if the ring tone is a downloadable content from the service provider's network, or discard it S353.

In the case of network downloadable content where User B chooses to download it, UE B initiates a regular PS data call to download the content S354. In the case of network downloadable content where User B chooses not to download it, UE B discards the content S355.

Following the download by UE B, the RT Cache server notifies the UGS of the completion of the ring tone download by user B S356. Credit is posted to User A's account for the sales of the ring tone to User B. This credit can be forwarded to the billing system for further use.

If no voice call S350 is received from User A for a configurable period of time, then the newly downloaded ring tone from User A is deleted from UE B. For example, if User A does not call User B within one hour, the newly downloaded ring tone is deleted.

In order for a caller to make use of remote ring tone control, the caller needs a mobile device with a remote ring tone control logic. The callee needs to have the remote ring tone control logic on the callee's mobile device as well so that the mobile device knows how to handle a command for remote ring tone control.

Figure 4:
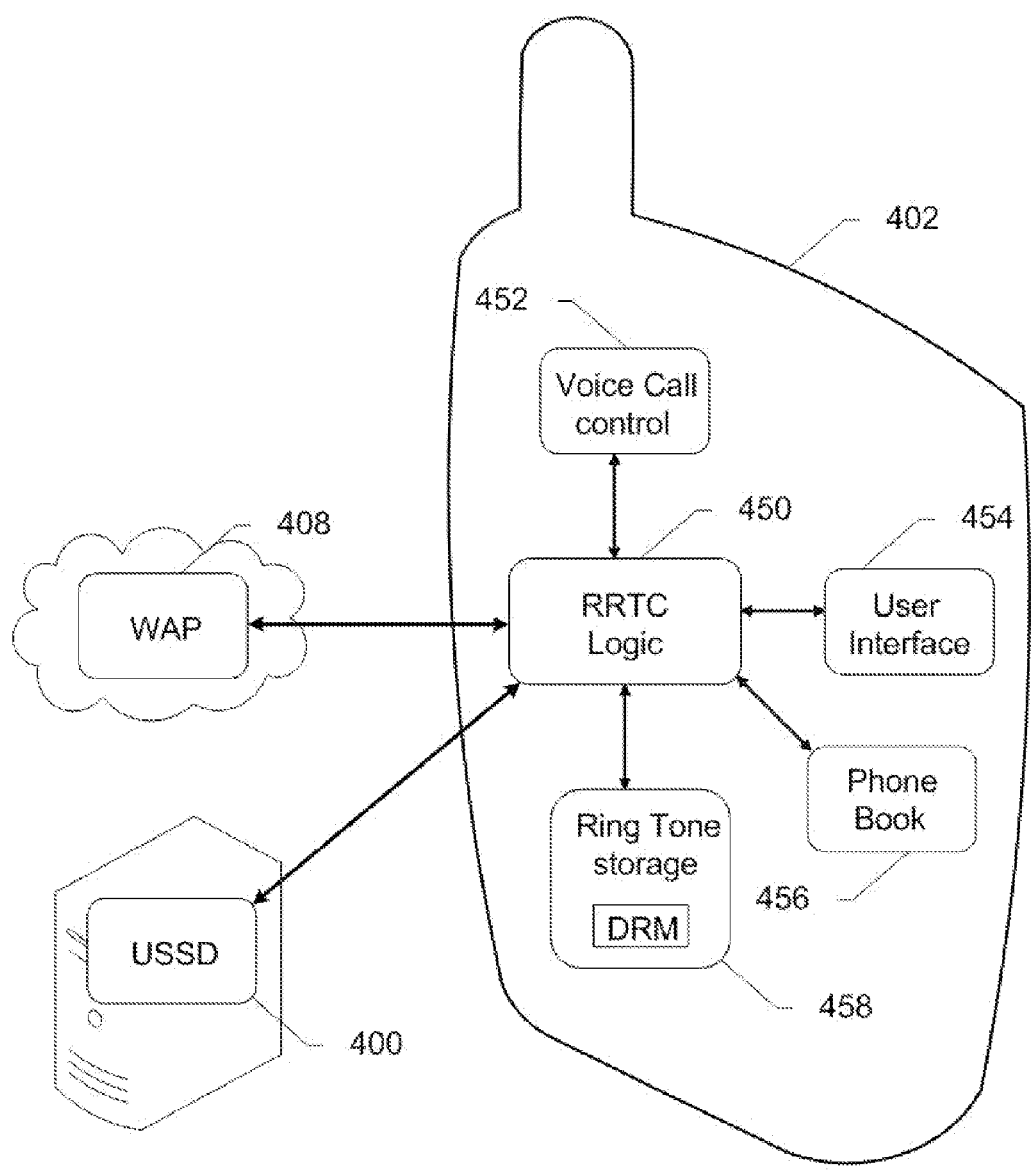
FIG. 4 shows a mobile device containing a remote ring tone control logic, according to an exemplary embodiment of the present invention.

FIG. 4 shows a mobile device 402 containing a remote ring tone control logic 450, according to an exemplary embodiment of the present invention. In this embodiment, mobile device 402 includes RRTC logic 450, a voice call control 452, a ring tone storage 458, a phone book 456, and a user interface 454. RRTC logic 450 communicates with each of the components. RRTC logic 450 provides for the creation and acceptance of remote ring tones. Created and accepted ring tones are sent to ring tone storage 458. Ring tone storage 458 is a memory on mobile device 402. RRTC logic 450, along with ring tone storage 458, manages the digital rights of each of the ring tones stored in ring tone storage. User interface 454 presents the user with options, prompts and takes the user's inputs, etc. User interface 454 allows the user to program preferences, initiate remote ring tones, create text messages, dial telephone numbers, etc. Phone book 456 allows the user to save contact information and set remote ring tone allowances and preferences. Phone book 456, sometimes called "contact list", allows the user to initiate the RRTC process within a phone book entry by selecting any contact in phone book 456 and choosing an option to initiate the RRTC process. This process starts by sending out a USSD message requesting an RRTC. Voice call control 452 is the unit where a voice call is managed. RRTC logic 450 interfaces with voice call control 452 to monitor the call status for managing call related RRTC functions. These functions may include, but are not limited to, receiving a request for temporary storage of a newly received ring tone, commanding user interface 454 to prompt an option to the user for purchasing or discarding a ring tone, etc. RRTC logic 450 is additionally in communication with a USSD control unit 400 and a WAP 408. USSD control unit 400 is where all USSD messages are processed. Thus, RRTC requests to and from mobile communications device 402 are routed through USSD control unit 400. WAP 408 is where ring tone downloads, ring tone uploads, and WAP browsing are initiated.

The digital right management (DRG) function can be an integrated part of the ring tone storage or can be separate from the mobile device but interacting with the ring tone storage. The memory for the RRTC logic can be the same memory for ring tone storage if there is enough storage space. The mobile device requires some mode of wireless communication including cellular radio frequency (RF), WiFi, BLUETOOTH, etc. The USSD gateway server works with both GSM and UMTS cellular systems and is service agnostic, which allows a mobile device having remote ring tone control to use either technology.

Within the RRTC logic is software which facilitates the caller's selection of a callee and a ring tone to send to the callee for the next call. The software most likely has a GUI where the caller can choose the callee, the ring tone, and any other options the caller might find pertinent to the process.

Figure 5:
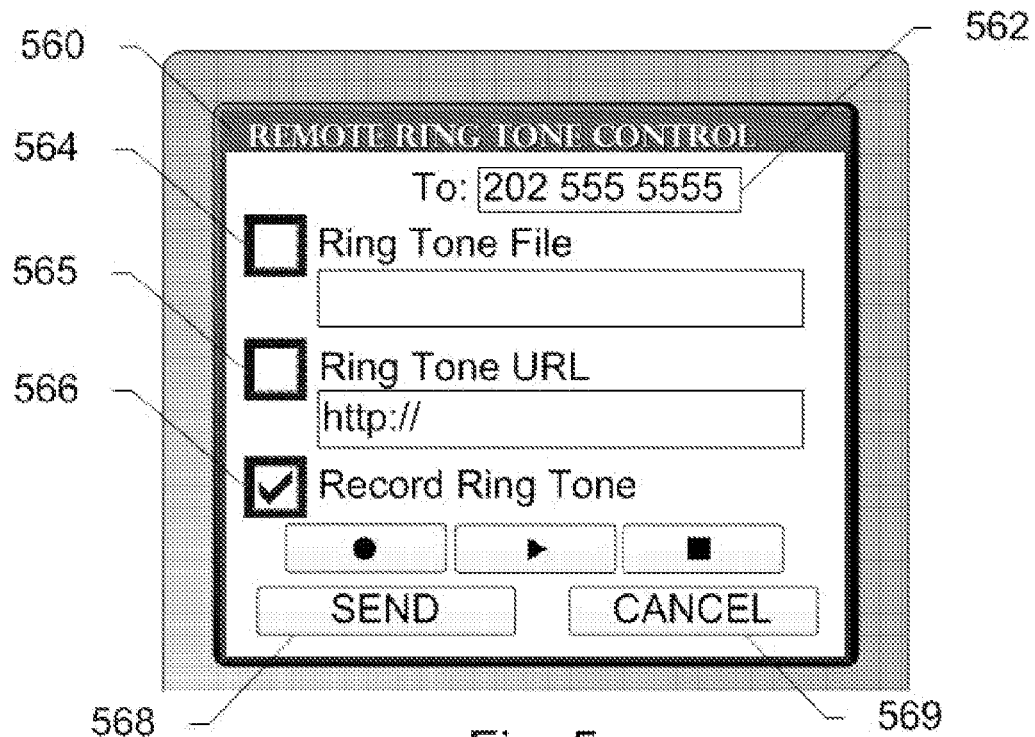
FIG. 5 shows a screenshot of a remote ring tone control menu, according to an exemplary embodiment of the present invention.

FIG. 5 shows a screenshot of a remote ring tone control menu 560, according to an exemplary embodiment of the present invention. In this embodiment, remote ring tone control menu 560 includes a contact selection 562, a ring tone file selection 564, a ring tone URL selection 565, a record ring tone selection 566, a send button 568, and a cancel button 569. Contact selection 562 allows a caller to select a callee the caller wishes to call and send a remote ring tone. The caller may enter the number of the callee, scroll through an address book, etc. to select the callee's contact number. Ring tone file selection 564 allows the caller to select a ring tone from the caller's mobile device to play on the callee's mobile device. The caller checks the box next to ring tone file selection 564 to select this option. Ring tone URL selection 565 allows the caller to type in or select the URL of a ring tone stored on a remote server. The caller checks the box next to ring tone URL selection 565 to select this option. Record ring tone selection 566 allows the caller to record the user's own ring tone for the callee. The caller checks the box next to record ring tone selection 566 to select this option. The caller presses the record button to record a sound clip or voice message. The caller may listen to the recording by pressing the play button. To stop the recording or the playback, the caller presses the stop button. When the caller has selected the desired ring tone options, the caller presses send button 568 to send the call and ring tone. If the caller does not wish to place the call with the selected options, the caller presses cancel button 569.

The remote ring tone control screen can have many variations, both functionally and stylistically. This screen can be brought up on the caller's mobile device by selecting the option from a contact within an address book. Doing so automatically inserts the telephone number of the contact into the contact selection.

The remote ring tone control logic also has software to facilitate assigning and modifying permissions and filters. A callee does not want every caller to be able to control their ring tone. The callee may want to allow a caller control over the ring tone, but not unlimited control. Some ring tones may have content ratings, but others, like caller created ring tones, do not have content ratings.

Figure 6:
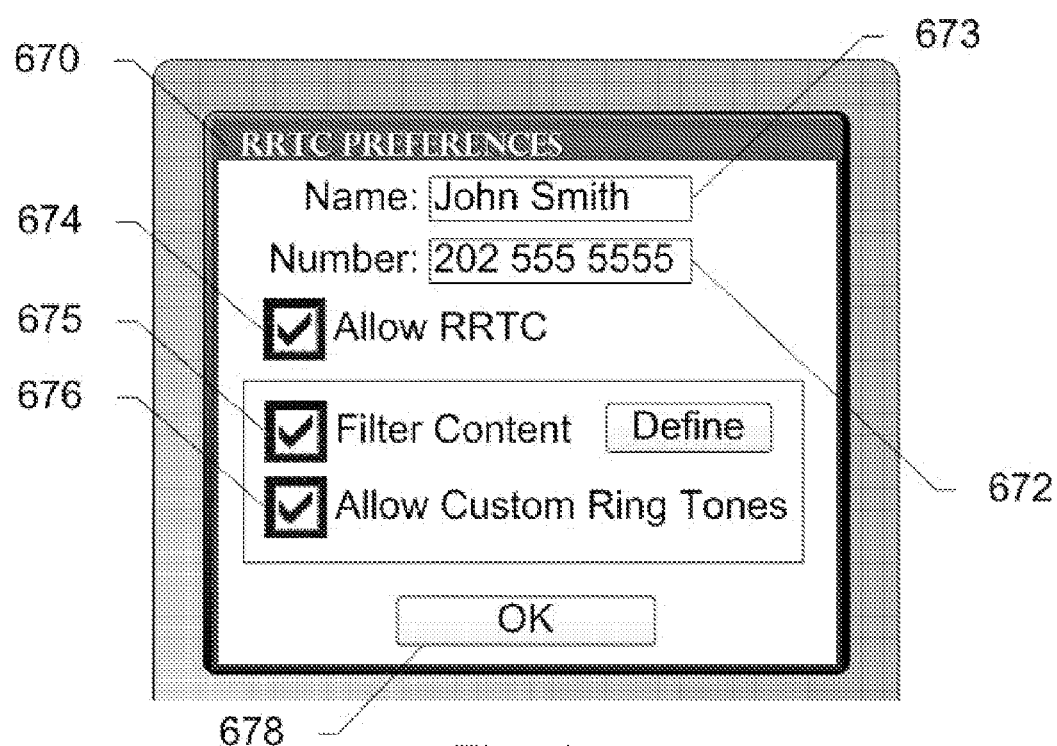
FIG. 6 shows a screenshot of a remote ring tone control preferences menu, according to an exemplary embodiment of the present invention.

FIG. 6 shows a screenshot of a remote ring tone control preferences menu 670, according to an exemplary embodiment of the present invention. In this embodiment, remote ring tone control preferences menu 670 includes a name selection 673, a telephone number selection 672, a remote ring tone control allowance selection 674, a content filter selection 675, a custom ring tone allowance 676, and an OK button 678. Name selection 673 allows a callee to select the name of a caller allowed to use the remote ring tone function on callee's telephone. The name may have multiple numbers associated with it, allowing a caller with multiple telephone numbers to use any of the caller's mobile devices. Telephone number selection 672 allows the callee to select specific numbers that are allowed to use the remote ring tone function on the callee's mobile device. Remote ring tone allowance selection 674 allows the callee to check a box if the selected caller has permission to use the remote ring tone function. Content filter selection 675 allows the callee to select types of remote ring tones which are not allowed. The callee selects a define button to define the filter. For example, a user may filter out any ring tones with strong language, unpleasant ideals, country music, etc. Custom ring tone allowance 676 provides the callee the ability to select whether or not to allow ring tones that have been created by the caller. OK button 678 allows the callee to accept the selections made on remote ring tone control preferences menu.

The RRTC preferences screen may be accessed from an address book on the mobile device. Exemplary embodiments of the preferences screen have many more options than shown. In some exemplary embodiments, callers are allowed more freedom during the evening hours or on weekends than during business hours. A callee may like to give their children unlimited control over their ring tone, but not during a business meeting.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
    receiving, at an unstructured supplementary service data gateway server, a ring tone upload request from a first mobile device, the ring tone upload request being in accordance with an unstructured supplementary service data service, and the ring tone upload request requesting permission to utilize a remote ring tone control service to upload a ring tone file to a ring tone cache server;
    in response to the ring tone upload request, querying, by the unstructured supplementary service data gateway server, a policy control server to determine whether a first user associated with the first mobile device is permitted to utilize the remote ring tone control service to upload the ring tone file to the ring tone cache server;
    receiving, by the unstructured supplementary service data gateway server, an indication from the policy control server that the first user is permitted to utilize the remote ring tone control service to upload the ring tone file to the ring tone cache server;
    in response to receiving the indication that the first user is permitted to utilize the remote ring tone control service to upload the ring tone file to the ring tone cache server,
        generating, by the unstructured supplementary service data gateway server, a first unstructured supplementary service data message indicating to the first user that the first user is permitted to utilize the remote ring tone control service to upload the ring tone file to the ring tone cache server, and
        sending, by the unstructured supplementary service data gateway server, the first unstructured supplementary service data message to the first mobile device;
    receiving, at the unstructured supplementary service data gateway server, a notification from the ring tone cache server, the notification indicating that the ring tone file has been uploaded by the first mobile device to the ring tone cache server, and the notification comprising a uniform resource locator for accessing the ring tone file stored on the ring tone cache server;
    in response to receiving the notification,
        generating, by the unstructured supplementary service data gateway server, a ring tone upload response, the ring tone upload response being in accordance with the unstructured supplementary service data service, the ring tone upload response indicating that the ring tone file has been uploaded by the first mobile device to the ring tone cache server, and the ring tone upload response comprising the uniform resource locator for the ring tone file stored on the ring tone cache server, and
        sending, by the unstructured supplementary service data gateway server, the ring tone upload response to the first mobile device;
    receiving, at the unstructured supplementary service data gateway server, a remote ring tone control request from a first mobile device, the remote ring tone control request comprising a special unstructured supplementary service data code indicating that the first mobile device is requesting permission to utilize the remote ring tone control service to remotely control a ring tone of a second mobile device, and the remote ring tone control request comprising a telephone number associated with the second mobile device;
    in response to the remote ring tone control request, querying, by the unstructured supplementary service data gateway server, the policy control server to confirm a permission of the first mobile device granted by a second user associated with the second mobile device to control the ring tone of the second mobile device; and
    in response to receiving a confirmation of the permission from the policy control server,
        generating, by the unstructured supplementary service data gateway server, a second unstructured supplementary service data message in accordance with the unstructured supplementary service data service, the second unstructured supplementary service data message comprising the uniform resource locator for the ring tone file stored on the ring tone cache server and a special unstructured supplementary service data code indicating that the remote ring tone control service has been invoked, and sending, by the unstructured supplementary service data gateway server, the second unstructured supplementary service data message to the second mobile device so that the second mobile device can download the ring tone file and utilize the ring tone file as the ring tone for calls originating from the first mobile device.

2. The method of claim 1, further comprising causing an account associated with the first mobile device to be credited upon a determination that the second mobile device has deleted the ring tone file previously downloaded to the second mobile device and the second user associated with the second mobile device has purchased a same ring tone file from a service provider associated with the unstructured supplementary service data gateway server.

3. A mobile device comprising:

a processor; and a memory that stores instructions which, when executed by the processor, cause the processor to perform operations comprising receiving an unstructured supplementary service data message from an unstructured supplementary service data gateway server, the unstructured supplementary service data message comprising a uniform resource locator for a ring tone file stored on a ring tone cache server and a special unstructured supplementary service data code indicating that a remote ring tone control service has been invoked by a different mobile device;

recognizing that the remote ring tone control service has been invoked based upon the special unstructured supplementary service data code;

extracting the uniform resource locator for the ring tone file stored on the ring tone cache server;

downloading the ring tone file from the ring tone cache server via the uniform resource locator;

storing the ring tone file;

activating the ring tone file as a ring tone for calls originating from the different mobile device;

receiving a call from the different mobile device;

in response to the call from the different mobile device, playing the ring tone file; and in response to the call being terminated, deleting the ring tone file, and prompting a user with an option to purchase the ring tone file.

4. The mobile device of claim 3, wherein the operations further comprise:

in response to prompting the user with the option to purchase the ring tone file, downloading the ring tone file.

5. The mobile device of claim 4, wherein downloading the ring tone file comprises downloading the ring tone file from the ring tone cache server.

6. The mobile device of claim 4, wherein downloading the ring tone file comprises downloading the ring tone file from a service provider's network.

7. The mobile device of claim 3, wherein the ring tone file is uploaded to the ring tone cache server by the different mobile device.

8. The mobile device of claim 3, further comprising a display; and wherein the operations further comprise:

presenting, on the display, a remote ring tone control preferences menu comprising a name selection that allows the user to select a name of a caller;

a telephone number selection that allows the user of to select a telephone number of the caller; and a remote ring tone allowance selection that allows the user to indicate whether the caller has permission to use the remote ring tone control service to control the ring tone of the mobile device.

9. The mobile device of claim 8, wherein the caller is associated with the second mobile device.

10. The mobile device of claim 8, wherein the remote ring tone control preferences menu further comprises a content filter selection that allows the user to select types of remote ring tones which are not allowed.

11. The mobile device of claim 8, wherein the remote ring tone control preferences menu further comprises a custom ring tone allowance selection that provides the user an option to select whether to allow ring tones created by the caller.

12. The mobile device of claim 8, wherein the remote ring tone control preferences menu is made accessible via an address book of the mobile device.

13. The mobile device of claim 3, wherein the ring tone file is subject to digital rights management.

14. The mobile device of claim 3, wherein the right tone file is created by a user associated with the different mobile device.

15. An unstructured supplementary service data gateway server comprising:

a processor; and a memory that stores instructions which, when executed by the processor, cause the processor to perform operations comprising receiving a ring tone upload request from a first mobile device, the ring tone upload request being in accordance with an unstructured supplementary service data service, and the ring tone upload request requesting permission to utilize a remote ring tone control service to upload a ring tone file to a ring tone cache server, in response to the ring tone upload request, querying a policy control server to determine whether a first user associated with the first mobile device is permitted to utilize the remote ring tone control service to upload the ring tone file to the ring tone cache server, receiving an indication from the policy control server that the first user is permitted to utilize the remote ring tone control service to upload the ring tone file to the ring tone cache server, in response to receiving the indication that the first user is permitted to utilize the remote ring tone control service to upload the ring tone file to the ring tone cache server, generating a first unstructured supplementary service data message, the first unstructured supplementary service data message indicating to the first user that the first user is permitted to utilize the remote ring tone control service to upload the ring tone file to the ring tone cache server, and sending the first unstructured supplementary service data message to the first mobile device, receiving a notification from the ring tone cache server, the notification indicating that the ring tone file has been uploaded by the first mobile device to the ring tone cache server, and the notification comprising a uniform resource locator for accessing the ring tone file stored on the ring tone cache server, in response to receiving the notification, generating a ring tone upload response, the ring tone upload response being in accordance with the unstructured supplementary service data service, the ring tone upload response indicating that the ring tone file has been uploaded by the first mobile device to the ring tone cache server, and the ring tone upload response comprising the uniform resource locator for the ring tone file stored on the ring tone cache server, and sending the ring tone upload response to the first mobile device, receiving a remote ring tone control request from the first mobile device, the remote ring tone control request comprising a special unstructured supplementary service data code indicating that the first mobile device is requesting permission to utilize the remote ring tone control service to remotely control a ring tone of a second mobile device, and the remote ring tone control request comprising a telephone number associated with the second mobile device, in response to the remote ring tone control request, querying the policy control server to confirm a permission of the first mobile device granted by a second user associated with the second mobile device to control the ring tone of the second mobile device, and in response to receiving a confirmation of the permission from the policy control server, generating a second unstructured supplementary service data message in accordance with the unstructured supplementary service data service, the second unstructured supplementary service data message comprising the uniform resource locator for the ring tone file stored on the ring tone cache server and a special unstructured supplementary service data code indicating that the remote ring tone control service has been invoked, and sending the second unstructured supplementary service data message to the second mobile device so that the second mobile device can download the ring tone file and utilize the ring tone file as the ring tone for calls originating from the first mobile device.

16. The unstructured supplementary service data gateway server of claim 15, wherein the operations further comprise causing an account associated with the first mobile device to be credited upon a determination that the second mobile device has deleted the ring tone file previously downloaded to the second mobile device and the second user associated with the second mobile device has purchased a same ring tone file from a service provider associated with the unstructured supplementary service data gateway server.

* * * * *